(12) United States Patent
Casler

(10) Patent No.: US 7,316,401 B2
(45) Date of Patent: Jan. 8, 2008

(54) MODULAR GASKET

(75) Inventor: Arvid A. Casler, Mundelein, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 188 days.

(21) Appl. No.: 11/141,892

(22) Filed: Jun. 1, 2005

(65) Prior Publication Data

US 2006/0273527 A1    Dec. 7, 2006

(51) Int. Cl.
*F02F 11/00* (2006.01)
*F16J 15/02* (2006.01)

(52) U.S. Cl. .................. 277/598; 277/630; 277/317

(58) Field of Classification Search ............. 277/598, 277/630, 317, 596, 316
See application file for complete search history.

(56) References Cited

U.S. PATENT DOCUMENTS

| | | | |
|---|---|---|---|
| 1,602,515 A | 10/1926 | Bailey | |
| 1,627,167 A | 5/1927 | Fitzgerald | |
| 1,730,110 A | 10/1929 | Bailey | |
| 1,771,596 A | 7/1930 | Victor | |
| 1,804,574 A | 5/1931 | Victor | |
| 2,679,241 A | 5/1954 | Dickson | 123/193 |
| 3,448,986 A | 6/1969 | Jelinek et al. | 277/180 |
| 3,499,655 A | 3/1970 | Czernik et al. | 277/235 |
| 4,103,913 A * | 8/1978 | McDowell | 277/592 |
| 4,213,620 A * | 7/1980 | Kennedy et al. | 277/596 |
| 4,880,669 A * | 11/1989 | Dorn et al. | 427/210 |
| 4,993,723 A * | 2/1991 | Sroka et al. | 277/596 |
| 5,145,190 A | 9/1992 | Boardman | 277/166 |
| 5,564,714 A | 10/1996 | Katsuno et al. | 277/9.5 |
| 5,603,515 A | 2/1997 | Bock | 277/235 B |
| 5,615,898 A * | 4/1997 | Clark et al. | 277/596 |
| 5,681,048 A * | 10/1997 | Tronel | 277/592 |
| 5,713,582 A | 2/1998 | Swensen et al. | 277/312 |
| 5,730,448 A | 3/1998 | Swensen et al. | 277/630 |
| 5,735,532 A | 4/1998 | Nolan et al. | 277/630 |
| 5,735,533 A | 4/1998 | Nolan et al. | 277/630 |
| 5,803,465 A * | 9/1998 | Schweiger | 277/593 |
| 6,015,152 A | 1/2000 | Swensen et al. | 277/321 |
| 6,592,128 B2 | 7/2003 | White | 277/628 |
| 6,682,075 B2 * | 1/2004 | Gottel | 277/317 |
| 6,845,984 B2 * | 1/2005 | Doyle | 277/317 |
| 2002/0063397 A1* | 5/2002 | Gaines et al. | 277/630 |

* cited by examiner

*Primary Examiner*—Alison K Pickard
(74) *Attorney, Agent, or Firm*—Robert L. Stearns; Dickinson Wright PLLC

(57) ABSTRACT

A static gasket assembly having a grid-like carrier (10, 10') formed as a mesh of overlapping strands. Openings (16-22) are created strategically in the carrier (10, 10') with the severed ends of the strands forming cantilever stems (12) projecting inwardly. Any one of a variety of specially configured sealing elements (24, 30, 32, 36, 38) are pressed into the respective openings (16-22) with the cantilever stems (12) engaging a peripheral groove (26) in each sealing element to retain the respective sealing elements in position. The gasket assembly is then placed over a surface to be sealed (40) and the carrier (10, 10') can either be removed, or remain as a permanent fixture of the gasket assembly.

7 Claims, 3 Drawing Sheets

MODULAR GASKET

BACKGROUND OF THE INVENTION

1. Field of the Invention

The invention relates generally to static gaskets of the type for perfecting a gas or liquid seal between two opposing surfaces, and more particularly toward a modular gasket assembly which is readily adaptable from one application configuration to the next or from one design revision to the next in a product development sequence.

2. Related Art

Static gasket assemblies are used when any two opposing surfaces must be brought together with a liquid or gas tight seal. In the example of an internal combustion engine, such gasket assemblies are used in many locations, including between the cylinder head and cylinder block. Specialized sealing elements of the cylinder head gasket surround the combustion chambers, and other specialized sealing elements are disposed around oil flow passages, coolant flow passages, and the like. Other gasket applications for engines, such as intake manifolds, exhaust manifolds, water pumps and oil pans, also require specialized sealing elements configured to meet the intended application.

A gasket assembly typically includes a sheet-like gasket body, or carrier, made of resilient metal, rubber-fiber, or other suitable material. The carrier functions primarily as a supporting element for holding various sealing elements in precise locations aligned with features in the surfaces to be sealed. The carrier may also include holes or notches for fasteners or locating pins.

These traditional style gasket assemblies have proven to be robust and effective. However, their shortcoming lies in the manufacturing processes required to form and assemble them. Due to the inherent inefficiencies in lost time and productivity due to machine set-up, most manufacturing methods dictate running high-volume productions of any one particular style gasket assembly. To ensure that enough gaskets of any particular configuration are manufactured, a particular style gasket assembly is sometimes over-produced.

There exists a need for a gasket assembly which can be more readily adapted from one application to the next so that machine set-up time might be reduced and the burden associated with running high-volume productions of any one given gasket style can be reduced.

SUMMARY OF THE INVENTION AND ADVANTAGES

According to one aspect of the invention, a static gasket assembly adapted for compressed disposition between two opposing surfaces is provided for perfecting a seal on at least one of the two opposing surfaces. The gasket assembly comprises a sheet-like carrier having at least one opening formed therein. A sealing element comprising an article of manufacture which is formed separately from the carrier is operatively disposed in the opening of the carrier. The carrier comprises a fabric-like web construction in which the opening of the sealing element can be placed at any location within the carrier thereby enabling the gasket assembly to be readily adapted from one application configuration to the next. Thus, the sealing element is formed as a modular item which can be located at any position within the body of the carrier by simply forming a opening in the carrier and inserting the sealing element into the opening. As a result, the only machine set-up required to change from one gasket type to the next may be a location and/or size change of punch dies in a stamping press.

According to another aspect of the invention, a static gasket assembly of the type adapted for compressed disposition between two opposing surfaces is provided for perfecting a seal on at least one of the two opposing surfaces. The gasket assembly according to this aspect of the invention comprises a sheet-like carrier having at least one opening formed therein for aligning with a feature on one of the two opposing surfaces. The carrier comprises a fabric-like web construction. A sealing element comprising an article of manufacture formed separately from the carrier is operatively engaged in the opening of the carrier. A releasable retention feature is provided for automatically disconnecting the sealing element from the opening in response to a disconnection force after the sealing element has been located on one of the opposing surfaces thereby allowing removal of the carrier for reuse or recycling while the sealing element remains behind to perfect a seal between the opposing surfaces. Accordingly, the carrier can be removed and discarded. This has the added effect of reducing the loaded area between the opposing surfaces, leaving only the sealing component to carry the compression loads. Thus, less load is required to create a satisfactory seal because the compression loads are concentrated specifically through the sealing element.

According to yet another aspect of the invention, a method for forming an assembled gasket of the type for perfecting a seal between two opposing surfaces is provided. The method comprises the steps of forming a grid-like carrier of intersecting strands in a regular or irregular repeating geometrical pattern, forming an opening in the carrier having a size greater than the size of the repeating geometrical pattern, forming a sealing element with a retention feature supported on its periphery, pressing the sealing element into the opening in the carrier until the carrier strands engage the retention feature. In this method, the sealing element is operatively engaged in the opening in the carrier by a simple pressing operation, with the carrier strands automatically locking the sealing element into position as they engage within the groove around the sealing element. Because the opening in the carrier is sized greater than that of the repeating geometrical pattern, it is assured that at least a plurality of carrier strands are presented with which to interact with the groove in the sealing element.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE PREFERRED EMBODIMENT

Figure 1:
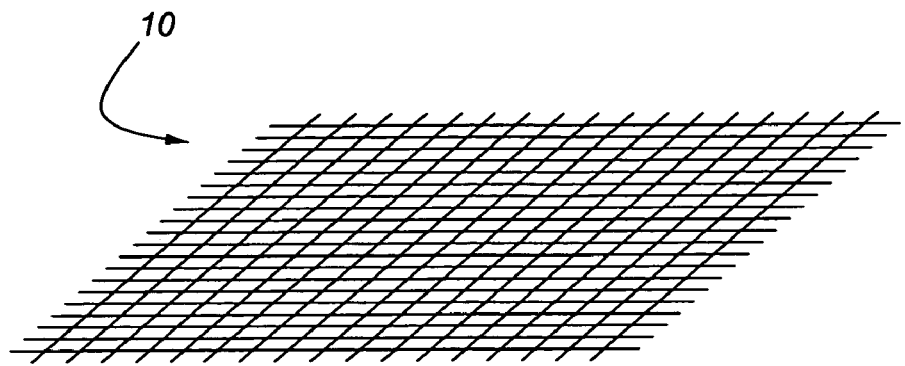
FIG. 1 is a perspective view of a carrier according to the subject invention prior to the formation of an opening therein.

Referring to the Figures, wherein like numerals indicate like or corresponding parts throughout several views, a sheet-like carrier for a static gasket assembly according to the subject invention is generally indicated at 10 in FIG. 1. The carrier 10 is formed as a fabric-like web construction. This web can be made from a polymeric material, such as a thermoplastic or thermoset polymer, or can be made from discrete strands of metal, or from other suitable compositions including cellulous and rubber-like products. The cross-section of each strand can be any shape, including the exemplary round style shown in the figures.

Any known construction technique for joining these strands can be used, including but not limited to the technique of weaving. Regardless of the assembly technique, a mesh is preferably formed by these strands as they overlap in a regular or irregular repeating geometrical pattern. In the case of two sets of parallel strands intersecting at right angles, a regular repeating geometrical pattern takes the form of squares or rectangles, and the distance between adjacent strands in any given set of parallel strands is referred to as the strand pitch. However, other stand orientations are certainly possible and the repeating geometric pattern need not be rectilinear. Nor is it necessary that the repeating pattern be composed of exclusively one shape, in which case the pattern will be of an irregular variety. If the carrier 10 is molded from a polymeric material, for example, the regular repeating geometrical pattern can be any advantageous shape or shapes. In some applications, in may even be desirable to vary the pitch in certain regions of the carrier 10, such as for the purpose of achieving optimal load distributions, and here again resulting in an irregular repeating pattern with each pattern sized differently.

Figure 2:
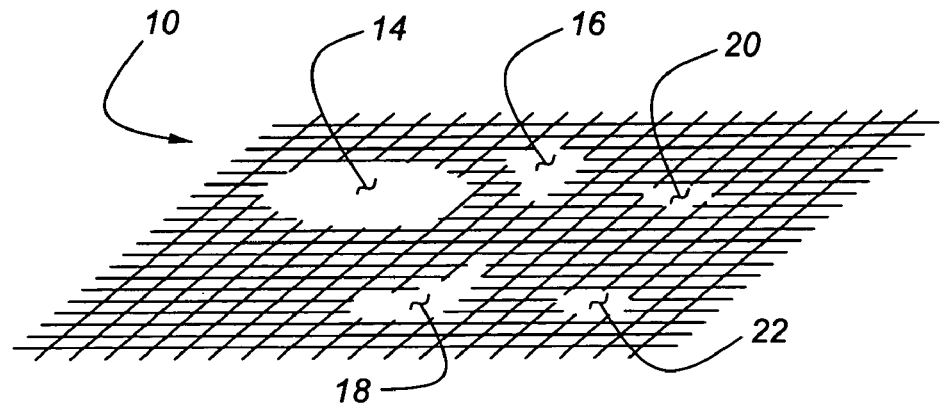
FIG. 2 is a view as in FIG. 1, however, a plurality of openings have been formed in the carrier.
Figure 7:
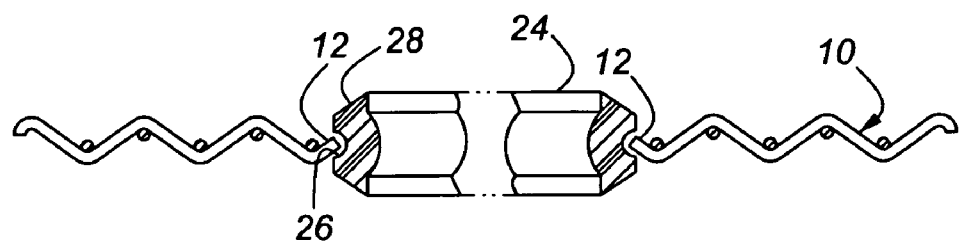
FIG. 7 is a simplified fragmentary cross-sectional view of a sealing element operatively positioned in an opening in the carrier.

FIG. 2 shows a further progression in the manufacturing operation from that shown in FIG. 1, wherein a plurality of openings have been formed into the fabric of the carrier at strategic locations intended to align with passages or other features on one or both of the opposing surfaces to be sealed. The openings may be of any dimensional size and shape, provided that each opening severs at least one strand thereby leaving a plurality of cantilever stems 12 formed by the severed strands (see FIG. 7). Taking, for example, the case of a cylinder head gasket, a large opening 14 may be of generally circular configuration and adapted for alignment over the combustion chamber of an internal combustion engine block. A pair of flanking openings 16, 18 may be of non-circular geometry and aligned over, perhaps, a coolant flow passage or other feature. Outlying openings 20, 22 provide additional examples of opening placement, size and application.

At least one, and preferably several, sealing elements are separately formed as articles of manufacture from a material or materials suitable for the intended sealing application. For example, and again considering the case of a cylinder head gasket, a sealing element for the combustion chamber must be rated for extremely high temperatures and pressures, and configured to withstand high compressive loads. However, the sealing element for the coolant passages in the same gasket can be rated for much lower temperatures and pressures, but with higher regard for corrosion resistance. Thus, the configuration and material composition of a sealing element will be varied to correspond with an intended application and environment.

Figure 3:
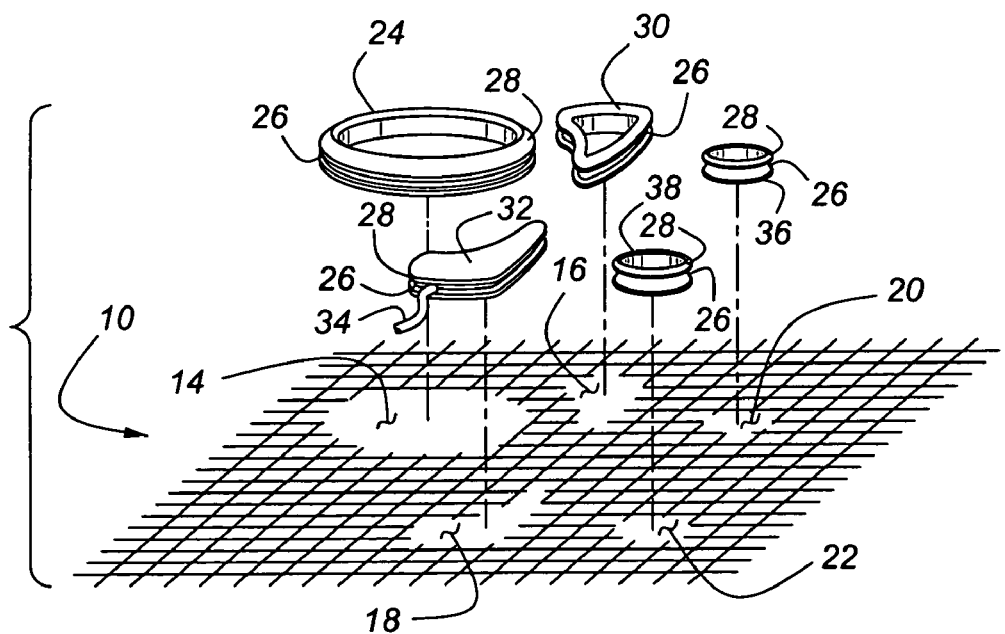
FIG. 3 is a perspective view as in FIG. 2, and showing various sealing elements ready for installation in respective openings in the carrier.

Referring to FIG. 3, the plurality of sealing elements are shown aligned over their respective openings in the carrier 10. A combustion sealing element 24 is aligned over the large opening 14 and has a generally circular construction. The combustion sealing element 24 has a general thickness which is greater than the general thickness of the carrier 10, and as shown may even be several times thicker than the carrier 10.

A retention feature is provided about the periphery of the combustion sealing element 24 for interacting with the cantilevered stems 12 projecting into the opening 24 in the carrier 10. The retention feature can of course take many forms, such as a raised lip or catches, but is here shown for simplicity comprising a simple groove 26 in the general plane of the carrier 10 and extending at least partly about the periphery of the sealing element 24. The outer diameter of the groove 26, at its root, may be sized to correspond closely to the internal diameter of the opening 14 so that the tips of the cantilever stems 12 remain in pressing contact to hold the sealing element 24 in a secure condition. To facilitate the assembly process, the sealing element 24 may be provided with a chamfered leading edge 28 which both centers the sealing element 24 in the opening 14 during the insertion process, and also uniformly deflects the cantilever stems 12 with wedge-like efficiency. Although the groove 26 is shown in the figures with a generally trough-like configuration, other geometries including non-symmetrical variations are possible. To facilitate the removal process, the retention feature also includes a release surface which enables the sealing element to be removed from the carrier 10. In the case of the groove 26 acting as the release surface, the enabling feature comprises the rounded bottom of the groove 26 against which the cantilever stems 12 can bend and smoothly ride.

Referring again to FIG. 3, additional sealing elements are shown including an irregularly shaped sealing element 30 adapted for insertion into the opening 16. This irregular sealing element 30 may be positioned and configured to perfect a fluid tight seal around a cooling flow passage, around an oil flow passage, around a push rod, or any other feature.

Another irregularly shaped sealing element 32 is especially adapted for engagement in the opening 18. The sealing element 32 represents a device intended to accomplish a particular function. For example, the device-type sealing element 32 may comprise a monitor for measuring temperature, pressure, stress, or other operating conditions. An electrical lead 34 may be required for transmitting information regarding the sensed condition to an appropriate data collection device. Alternatively, the device-type sealing element 32 may be of the type for controlling a feature or condition. As examples, such a device-type sealing element 32 may include a valve which selectively restricts or diverts flow of a liquid or gas between the two opposing surfaces to be sealed. For instance, a valve in the coolant flow passage could function like a thermostat. In another example, the device-type sealing element 32 may respond to vibrations and exert a variable dampening effect to attenuate objectionable vibrations. Other control functions are of course possible. Furthermore, the device-type sealing element 32 may be of the load distribution type whose primary or incidental function is to strategically spread and/or concentrate loads between the opposing surfaces to be sealed. In this condition, a device-type sealing element 32 may be resilient with spring-like qualities, or may be of a solid, substantially incompressible nature. In either case, the proper use of such a load distributing sealing element 32 can be effective to complete the sealing requirements and also to control noise, vibration and harshness issues in the system.

The irregular sealing element 30, the device-type sealing element 32, as well as the additional, exemplary sealing devices 36, 38 are provided with retention features similar to that of the groove 26 described in combination with the sealing element 24, as well as may be provided with similar chamfered edges 28 or other configurations to facilitate a push connection with the carrier 10.

Figure 4:
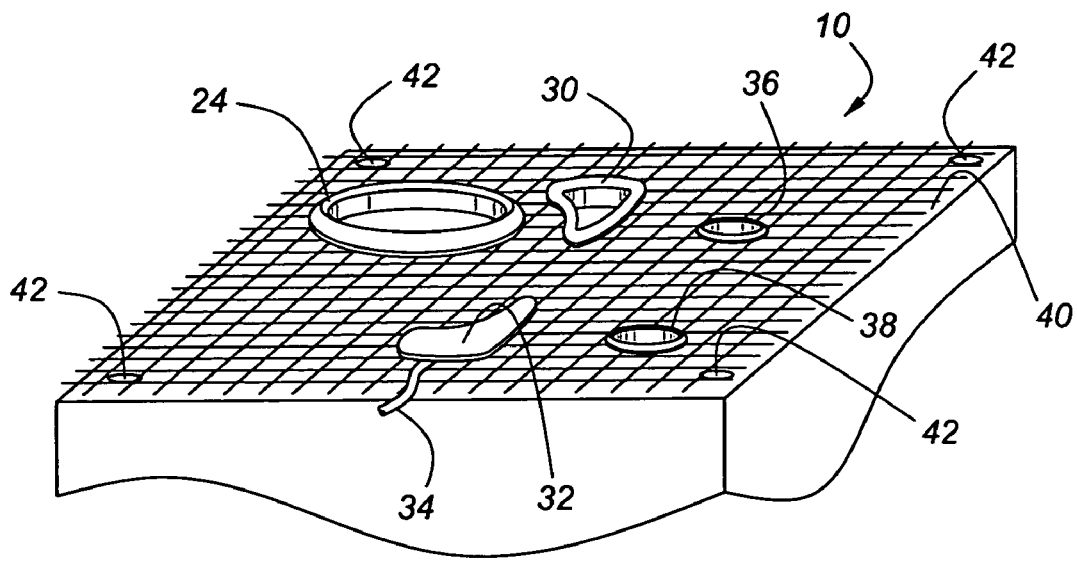
FIG. 4 is a simplified perspective view showing an assembled gasket according to the invention positioned over a surface to be sealed, with each of the sealing elements aligned over respective features on the surface to be sealed.
Figure 5:
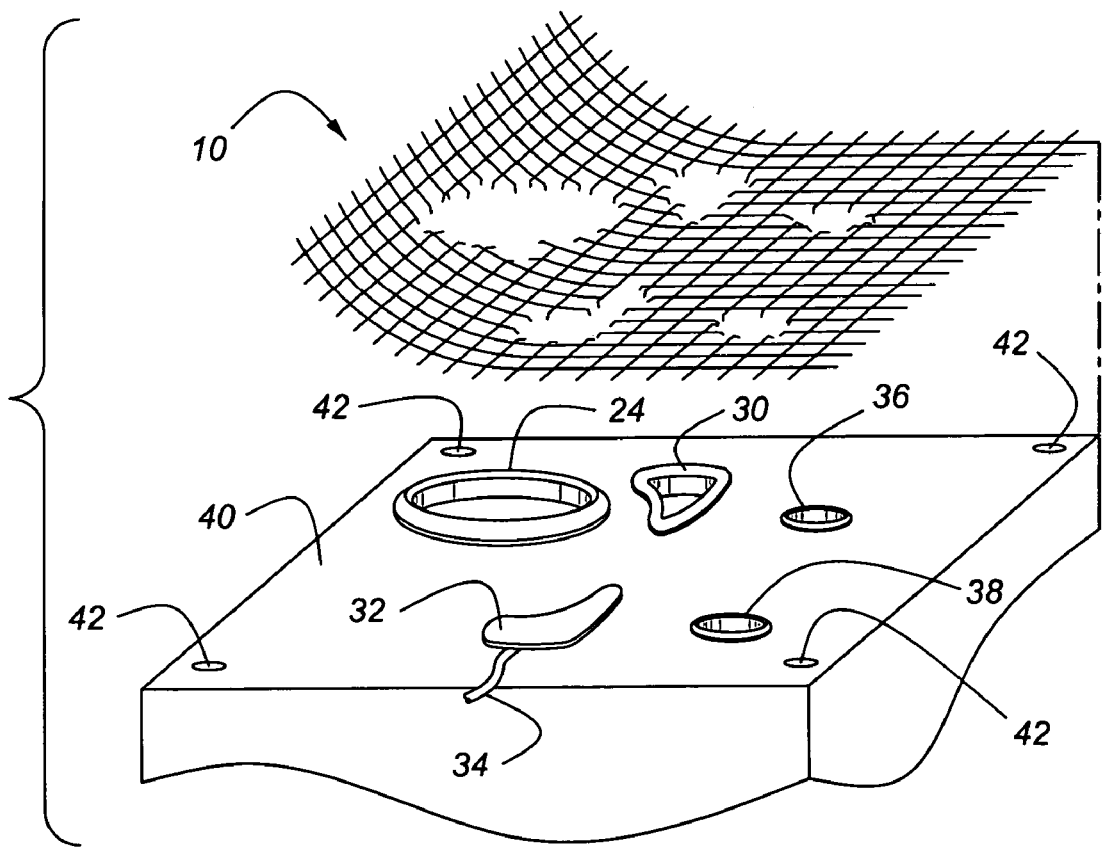
FIG. 5 is a perspective view as in FIG. 4 yet showing a further progression in the process where the carrier is removed yet the sealing elements remain aligned over their respective features on the surface to be sealed and in preparation to be compressed by an opposing surface.

FIG. 4 illustrates a fully assembled gasket assembly according to the invention positioned over a surface to be sealed 40. Once in position, with the sealing elements 24, 30, 32, 36, and 38 over their respective features, the carrier 10 can be removed as shown in FIG. 5. This is accomplished by holding each of the sealing elements 24, 30, 32, 36, and 38 in position upon the surface to be sealed 40, while the carrier 10 is lifted or otherwise pealed away. The sealing elements can be held in position in any number of ways. For examples, the sealing elements can be held in position by pressure applied from above, they can be held in position by gripping devices from below, they can be held by a specially applied adhesive or by a multi-purpose compound with adhesive qualities, by an interlocking engagement with the features in the surface to be sealed 40, or the like. The step of removing the carrier 10 causes the cantilever stems 12 to deflect out of engagement with the respective grooves 26. The carrier 10 can then be reused or recycled, or otherwise discarded.

When an opposing surface (not shown) is brought against the surface to be sealed 40, the compressive load is carried entirely by the sealing elements and therefore compression loads are concentrated in the most relevant areas only. Furthermore, because the carrier 10 has been removed, unnecessary weight is removed, as well as the potential for improved heat transfer and/or cooling between these opposing surfaces. Bolt holes 42 are formed in the surface to be sealed 40, and are exemplary as a part of the fastening system between the opposing surfaces with which compressive loads can be established and maintained.

Figure 6:
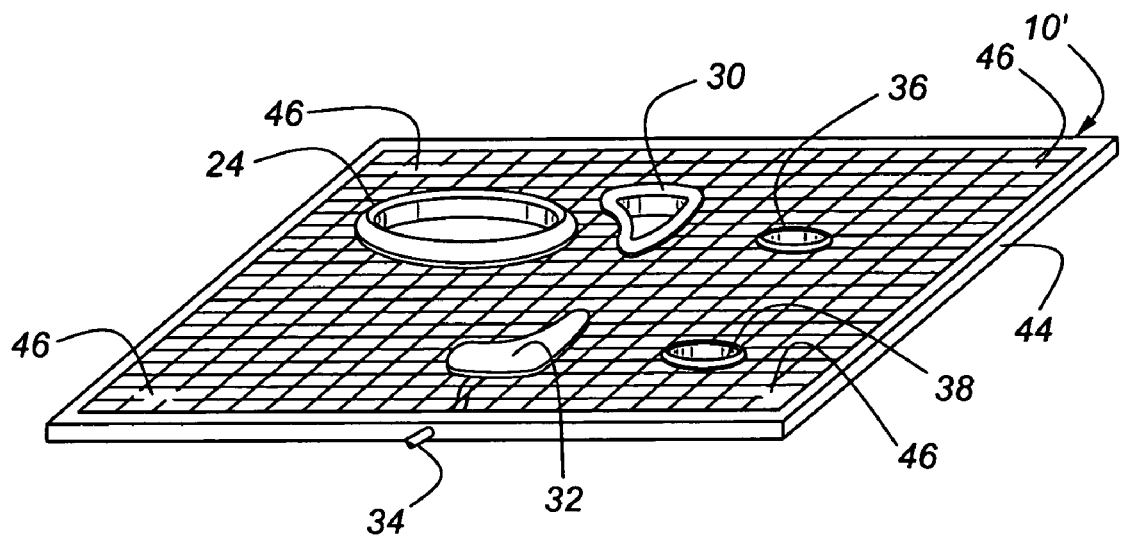
FIG. 6 is a perspective view of an alternative embodiment of the gasket assembly which is intended to remain permanently affixed between the two opposing surfaces to be sealed.

In FIG. 6, an alternative embodiment of the invention is shown wherein the carrier 10' is not removed from the surface to be sealed 40. Here, the carrier 10' includes an elastomeric edge banding 44 disposed about its periphery for establishing a seal between the two opposing surfaces. Also included are untrimmed openings 46 which align with the bolt holes 42 to provide clear passage for bolts or other fastening elements. The elastomeric seal 44 is particularly effective in situations where it may be necessary to prevent the egress of foreign material into the space between adjoining surfaces, e.g., between a cylinder head and a cylinder block. However, such a peripheral seal 44 may not be necessary in other applications such as in exhaust manifold gaskets for an internal combustion engine. Of course, other variations of the assembly may dictate a carrier 10' which remains clamped between the opposing surfaces but which does not include the elastomeric peripheral seal 44. Nevertheless, it may be desirable in some applications for the carrier 10, 10' to remain in position to help retain the various sealing elements 24, 30, 32, 36 and 38 in their precise location.

Additionally, if not removed prior to assembly of the opposing surfaces, the carrier 10, 10' may be specifically designed to help distribute the compressive loads. Because the carrier 10, 10' is formed of a fabric mesh, its resultant surface area is less than that of a traditional full-bodied carrier and lower clamping forces may be needed to achieve the same attributes.

Referring again to FIGS. 1 through 5 as a whole, the method for forming an assembled gasket of the type for perfecting a seal upon at least one of the two opposing surfaces is shown in sequence. The method comprises the steps of first forming a grid-like carrier 10, 10' of intersecting strands in a regular or irregular repeating geometrical pattern. In the case of an irregular repeating pattern, it is not necessary that every pattern thus formed be of identical size and shape, as some applications may require varied pitch spacing from one strand to the next. Next, an opening 14-22 is formed in the carrier 10, 10' having a size greater than the size of the repeating geometrical pattern. A sealing element 24, 30, 32, 36, 38 is separately formed as an article of manufacture and includes a retention feature, e.g., a groove 26, at least partially about its periphery. The sealing element is pressed into the opening in the carrier 10, 10' until the carrier strands engage the retention feature, e.g., seat within the groove 26. Thus, the gasket is conveniently assembled by the press fit retention of separately manufactured sealing elements into a opening or openings which may be formed anywhere within the body of the carrier 10, 10'.

When the openings 16-22 are formed into the carrier 10, 10', the individual strands are severed resulting in cantilever stems 12 which point into the opening and resiliently bend as the sealing element is pressed therein. These cantilever stems 12 then lock into the retention feature, securely holding the respective sealing element ready for installation. The installation procedure further includes the steps of positioning the assembled gasket upon a surface 40 to be sealed, and aligning the sealing elements 24, 30, 32, 36, and 38 over passages or other features. In one embodiment of the invention, the carrier 10 is disconnected from the sealing elements while the sealing elements remain aligned over their respective features. The carrier 10 is then recycled, reused or discarded. In another embodiment, the carrier 10' remains as a permanent fixture together with the sealing elements clamped between the opposing surfaces. The step of forming the grid-like carrier 10, 10' can be accomplished in any number of ways, including by weaving strands of metallic, polymeric, or cellulous material, or by other mesh forming techniques like brazing or bonding at overlapping junctures.

The sealing element 32 may be of a device-type structure, in which the method may further include the steps of monitoring an operating condition, controlling the flow of a fluid, and/or distributing a compressive load between the two opposing surfaces.

The gasket assembly made in accordance with the described procedures, and in mind of the various structural attributes described above, is particularly adaptable to manufacturing environments in which lower volume production runs can be accomplished without the inefficiencies inherent in prior art gasket manufacturing techniques. For example, in a cylinder head gasket for a given engine, there may be multiple gasket types (i.e., different part numbers) depending upon the engine configuration. If the same basic engine design has a high-output optional configuration, it is likely that the location of each sealing element will remain fixed, yet specific sealing elements of perhaps higher temperature or pressure ratings will be substituted for the regular configuration versions. Thus, due to the modular features of this gasket assembly, the sealing elements can be swapped and substituted without affecting the overall manufacturing operations.

Moreover, the subject gasket assembly may be readily applied into product prototyping situations, when testing and re-design sequences are carried out in iterative loops. Thus, the reduced fabrication times for each design revision can lead to shorter product development cycles.

A further advantage of the invention resides in the variability of the sealing elements which can be manufactured of different thicknesses one from another. Thus, in situations where it is necessary to distribute or concentrate the loads between the two opposing surfaces in a particular manner, the thickness of the respective sealing elements combined with their geometric shapes, are available to the design engineer as variables.

The grid-like carrier 10, 10' can be cut or otherwise formed with the openings 16-22 to accommodate any geometry sealing device or sealing element, and the pitch between adjacent strands in the mesh can be varied so that large mesh can be used when larger sealing elements are held and smaller mesh pitches can be used to accommodate smaller components. Furthermore, larger pitch mesh carriers 10, 10' may be suited to applications requiring better air flow or heat transfer, such as exhaust manifold gasket applications. The particular strands which are woven, interlaced, or otherwise affixed in a grid-like pattern can be of any cross-sectional geometry including round, rectangular, or otherwise. The carrier 10, 10' can be either temporary or permanent as the particular application and specific conditions may require. Furthermore, when compared to traditional full-body carriers used in prior art gaskets, manufacturing offal is significantly reduced by the use of the grid-like carrier 10, 10'.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method for forming and installing an assembled gasket of the type for perfecting a seal between two opposing surfaces, said method comprising the steps of:
   forming grid-like carrier of intersecting strands in a repeating geometrical pattern;
   forming an opening in the carrier having a size greater than the size of the repeating geometrical pattern;
   forming a sealing element with a retention feature on its periphery;
   pressing the sealing element into the opening in the carrier until the carrier strands engage the retention feature;
   positioning the assembled gasket upon a surface to be sealed, and aligning the sealing element over a feature in the surface to be sealed; and
   disconnecting the carrier from the sealing element while the sealing element remains aligned over the feature.

2. The method as set forth in claim 1 further including recycling the carrier.

3. The method as set forth in claim 1 wherein said step of forming the carrier includes the step of weaving the strands.

4. The method as set forth in claim 1 wherein said step of pressing the sealing element into the opening includes bending cantilever stems of the carrier.

5. The method as set forth in claim 1 further including monitoring an operating condition with the sealing element.

6. The method as set forth in claim 1 further including controlling the flow of a fluid with the sealing element.

7. The method as set forth in claim 1 further including distributing a compressive load between two opposing surfaces with the sealing element.

* * * * *